United States Patent [19]
Whitten

[11] Patent Number: 5,971,690
[45] Date of Patent: Oct. 26, 1999

[54] PARTS DISTRIBUTION APPARATUS

[75] Inventor: George Steven Whitten, Albany, Ga.

[73] Assignee: Agri Dynamics, Inc., Albany, Ga.

[21] Appl. No.: 09/258,558

[22] Filed: Feb. 26, 1999

[51] Int. Cl.[6] .............................. B65G 3/04; B65G 65/30; B65G 69/04
[52] U.S. Cl. .......................... 414/301; 198/534; 198/535
[58] Field of Search .................................. 414/300, 301, 414/302, 303, 193, 194, 195; 222/56; 198/534, 535

[56]  References Cited

U.S. PATENT DOCUMENTS

| | | | |
|---|---|---|---|
| 1,670,203 | 5/1928 | Möller | 414/302 |
| 3,456,818 | 7/1969 | Massey | 414/302 |
| 4,029,220 | 6/1977 | Greaves | 414/302 X |
| 4,131,192 | 12/1978 | Cipolla | 198/535 X |
| 4,941,792 | 7/1990 | Cimenti et al. | 414/302 X |
| 5,022,806 | 6/1991 | Lonardi et al. | 414/302 X |

FOREIGN PATENT DOCUMENTS

| | | | |
|---|---|---|---|
| 58-113034 | 7/1983 | Japan | 414/301 |
| 61-162428 | 7/1986 | Japan | 414/302 |

*Primary Examiner*—Christopher P. Ellis
*Assistant Examiner*—Gerald J. O'Connor
*Attorney, Agent, or Firm*—Thomas C. Saitta

[57]  ABSTRACT

A parts distribution apparatus having a funnel hopper to receive parts dropped from above and a flexible distribution chute to deliver parts through a discharge opening into a storage hopper, where said distribution chute is rotated to vary the discharge location, with the distribution chute being pulled across the top surface of the pile of parts deposited within the storage hopper so that the discharge opening remains on the top surface regardless of the height of the top surface within the storage hopper.

20 Claims, 2 Drawing Sheets

PARTS DISTRIBUTION APPARATUS

BACKGROUND OF THE INVENTION

This invention relates generally to the field of material handling equipment used to deliver discrete parts or items, and in particular relates to such equipment where the parts are received into a bin, hopper or container for subsequent controlled distribution. Even more particularly, the invention relates to such equipment for use in applications where the parts are relatively fragile or susceptible to damage during the handling process, such that placement and distribution within the bin must take into account the need to preclude rough handling of the parts.

In many material handling operations, large amounts of material, discrete parts, items or objects must be transferred or conveyed from one source or location to another for further processing, packaging or the like. It is often necessary to provide intermediary temporary storage means so that the rate of parts delivery into the temporary storage means does not need to equal the rate of removal from the storage means. For example, where large numbers of relatively small parts or items must be handled, it is common to find a temporary storage means consisting of a relatively large bin or hopper with a large top opening and a small, controlled distribution opening or mechanism. The parts are deposited into the bin from above and a reserve supply of parts is maintained within the bin such that parts are always available for removal from the bin as needed. The rate of discharge of parts from the bin is completely independent of the rate of deposition of parts into the bin. A typical set-up for this type of equipment may comprise a storage bin with sloped sides to funnel the parts into a chute for further distribution, with the parts dropped into the bin from a conveyor belt or chute located above the bin.

Such material handling equipment is suitable for many types of material or parts, but the typical apparatus is not optimally designed for circumstances where the parts are susceptible to damage during the handling operation, such as with precision parts or parts composed of fragile material. It is therefore desirable to provide an improved material handling equipment apparatus or system where the parts being handled are manipulated gently so that the potential for damage is dramatically reduced.

It is an object of this invention to provide a material handling apparatus or system where fragile parts or parts susceptible to damage are handled in a manner which precludes damage to the parts, and in particular it is an object to provide such an apparatus which receives parts in a controlled manner and gently distributes the parts within a temporary storage bin for later distribution as needed. It is a further object to provide such an apparatus which provides means to receive large numbers of discrete parts concurrent with means to direct and evenly distribute the parts into a storage bin to accumulate a number of parts therein. These objects and other objects not expressly stated will be made clear from the disclosure which follows.

SUMMARY OF THE INVENTION

The invention comprises in general a material handling parts distribution apparatus which will be typically found as a component of a more extensive material handling system, the apparatus having a parts receiving means designed to receive a large number of individual parts, items, or other material objects from other distinct handling equipment antecedent in the material handling operation, such as from a conveyer belt or dribble chute, and parts distribution means to deliver the parts into a temporary storage bin or hopper for subsequent distribution in the material handling operation, where the invention receives and distributes the parts in a gentle and controlled manner to prevent damage to the parts.

The parts distribution apparatus comprises in general a funnel-shaped receiver hopper having a relatively large open top and a sloping slide to direct parts to a relatively small diameter discharge spout at the bottom. The discharge spout is curved and is preferably composed of metal for durability. A flexible distribution chute or tube is connected to the bottom of the discharge spout and is mounted such that the lower portion of the chute and the distribution opening is angled away from the vertical axis. Rotation means to rotate the distribution chute in a continuous or indexed manner is provided such that the position of the opening of the distribution chute does not remain stationary relative to the storage bin. The direction of rotation is opposite to the direction of travel of the parts distributed from the distribution chute, such that the distribution chute is pulled across the top surface of previously deposited parts as it is rotated about the vertical axis. The apparatus may also be provided with means to raise the entire apparatus relative to the storage hopper should the collection of parts within the storage hopper become too high.

DETAILED DESCRIPTION OF THE INVENTION

Figure 1:
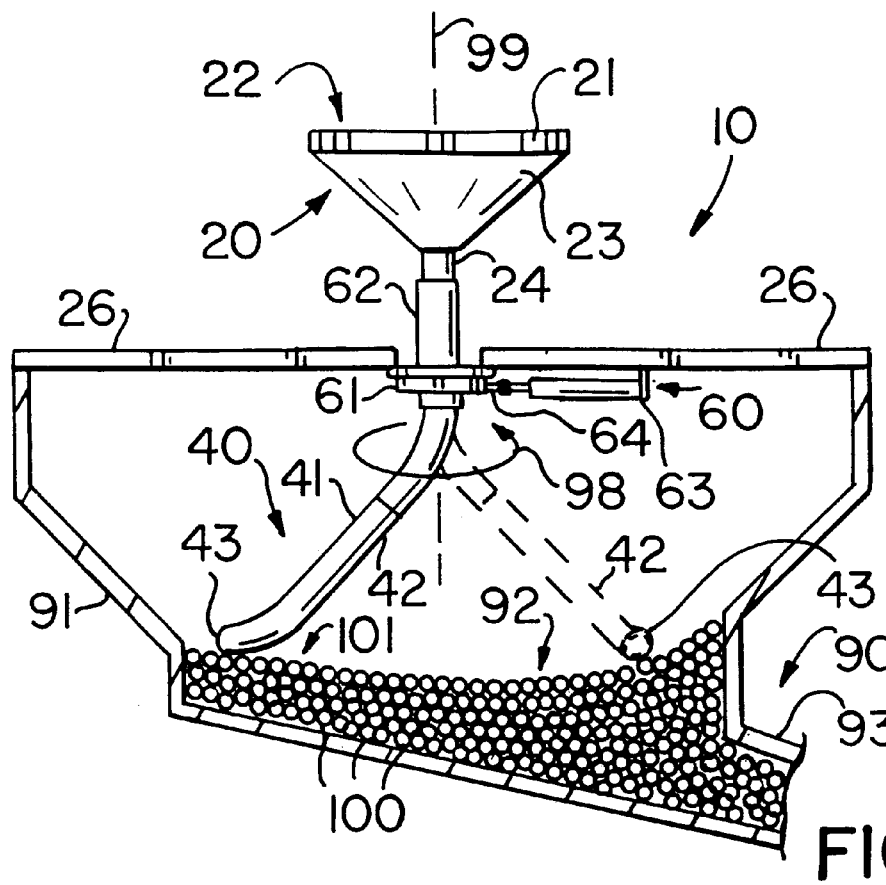
FIG. 1 is a side view of the invention with the storage hopper shown in cross-section to expose the parts distribution apparatus.

With reference to the drawings, the invention will now be described in detail with regard for the best mode and the preferred embodiment. In general, the invention is a parts distribution apparatus 10 which receives objects, parts, items, etc., hereinafter referred to generally as parts 100, vertically from preceding material handling equipment and gently distributes the parts 100 into a storage hopper, bin or other receptacle 90 in an evenly distributed manner for storage and subsequent distribution as needed. The invention generally comprises parts receiving means 20, means 40 to deliver the parts 100 into the receptacle area 92 of the storage hopper 90, and means 60 to move the position of the discharge opening 43 relative to the receptacle area 92. The apparatus 10 may further comprise means 80 to alter the height of the parts distribution apparatus 10 relative to the storage hopper 90.

Figure 2:
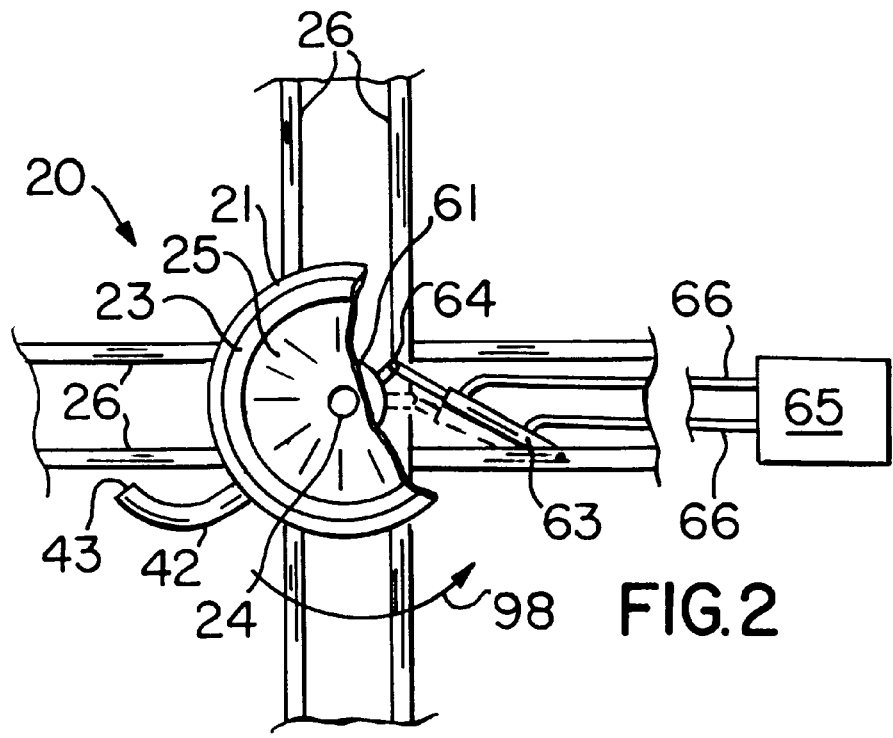
FIG. 2 is a top view of the invention showing the parts receiving means and the means to move the discharge opening relative to the storage hopper receptacle area.

As shown in FIGS. 1 and 2, the parts distribution apparatus 10 is an apparatus that can be added to or incorporated into a storage hopper 90. Storage hopper 90 is any receptacle for receiving parts 100 deposited from above the storage hopper 90, such as from a conveyer belt or dribble chute, and often will incorporate vibration means to impart movement to the parts 100. The storage hopper is comprised of side walls 91, usually inclined to funnel parts 100 to a particular area, with the side walls 91 defining a receptacle area 92 which is relatively large in relation to the size of the parts 100, such that a large number of parts 100 can be retained within receptacle area 92. A feed chute 93 or other means for removal of parts 100 from the lower area of the receptacle area 92 is provided for further distribution of the parts 100 from the storage hopper 90. The rate of introduction of parts 100 into the storage hopper 90 is independent of the rate of distribution of parts 100 from the storage hopper 90. Such storage hoppers 90 are well known in the material handling industry.

The parts distribution apparatus 10 comprises means 20 to receive the parts 100 from preceding material handling equipment and as shown comprises a funnel hopper 21 for capturing the parts 100 dropped from above, the funnel hopper 21 having an open top 22, inclined walls 23 and a discharge spout or opening 24 at its bottom, the inclined walls 23 directing the parts 100 into the discharge spout 24. The funnel hopper 21 may be provided with a padded or cushioned liner member 25, which may be a separate component or consist of a coating applied to the inclined walls 23, to prevent damage to the parts 100 when they strike the inclined walls 23. The funnel hopper 21 is aligned along vertical axis 99. The discharge spout 24 connects to means 40 to deliver the parts 100 into the receptacle area 92 of the storage hopper 90. Delivery means 40 comprises an elbow spout 41 which is curved to alter the downward movement direction of the parts 100 away from the vertical axis 99. Preferably elbow spout 41 is rigid and formed of a metal or similarly hard and durable material, as there will be a tendency for the parts 100 to repeatedly strike the same general location within the elbow spout 41 as they fall from the funnel hopper 21. The elbow spout 41 also preferably decreases in internal diameter to direct the parts 100 into a flexible distribution chute or hose 42, which is preferably formed of a wire-reinforced polymer or rubber material. The configuration of the distribution chute 42 further angles the direction of travel of the parts 100 away from the vertical axis 99, such that when the parts exit from the discharge opening 43 at the end of the distribution chute 42 they are traveling at a relatively low velocity. The flexible nature of the discharge chute 42 allows it to rest on the bottom of the receptacle area 92 when only a small number of parts 100 are in the storage hopper 90, so that parts 100 exiting the discharge opening 43 will not fall any significant distance. Over time a large number of parts 100 will build up in the receptacle area 92 of the storage hopper 90, and the flexible discharge chute 42 will bend to remain atop the top surface 101 of the pile of parts 100 due to the action of the discharge opening movement means 60.

Figure 5:
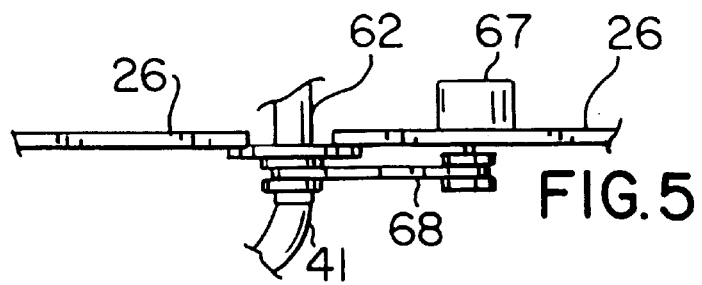
FIG. 5 is a partial side view showing the use of a motor as the discharge opening movement means.

In order to evenly and gently distribute the parts 100 into the receptacle area 92 of the storage hopper 90, means 60 are provided to move the discharge opening 43 of the distribution chute 42 relative to the receptacle area 92 in either an indexed or continual motion. In this manner the parts 100 are not all deposited in the same location. The discharge opening movement means 60 rotates the distribution chute 42 and elbow spout 41 about the vertical axis 99 in the rotation direction 98, such that the discharge opening 43 trails the discharge chute 42 as the parts delivery means 40 is rotated, the discharge opening 43 facing away from the rotation direction 98. As shown in the drawings, one embodiment for discharge opening movement means 60 comprises a roller clutch or ratcheting mechanism 61 which allows rotational movement in only one direction, the roller clutch 61 turning the elbow spout 41 and/or the discharge spout 24 of the funnel hopper 21 dependent on how the bearings assembly 62 is mounted relative to the support members 26, which attach the parts distribution apparatus 10 to the storage hopper 90. An indexing piston 63 is affixed to the support members 26 and to a linkage arm 64 extending from the roller clutch 61, where the piston 63 is operated by a pneumatic or hydraulic drive controller 65 through conduits 66, such that one stroke of the piston 63 rotates or indexes the parts delivery means 40 a short distance in the rotation direction 98, while the second stroke resets the roller clutch 61 (as shown by the dashed lines in FIG. 2). With the structure as shown, the discharge opening movement means 60 may be set for example to advance the distribution chute 42 every 30 seconds, with each indexing moving the discharge opening 43 forty-five degrees in the rotation direction 98. Alternatively, the parts delivery means 40 could be rotated by any other suitable mechanism, such as for example a motor 67 connected to the parts delivery means 40 by gears or a belt 68, as shown in FIG. 5, and the rotation could be continuous or indexed.

Figure 3:
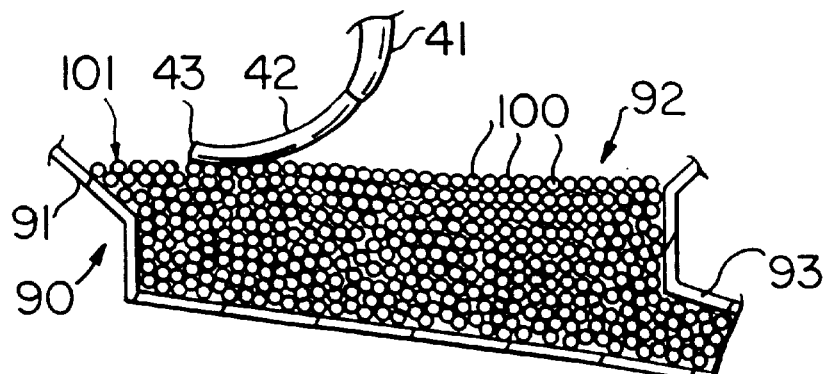
FIG. 3 is a partial view similar to FIG. 1 showing the position of the distribution chute when a greater number of parts are present in the storage hopper.

Movement of the discharge opening 43 and distribution chute 42 results in an even distribution of parts in a circular manner around the outside of the receptacle area 92 of the storage hopper 90, rather than in a centrally located pyramid which is the normal case for parts 100 dropped into a storage hopper 90. As the distribution chute 42 is pulled along the rotation direction 98, it rides along and atop the top surface 101 of the pile of parts 100 no matter the height of the top surface 101. As the parts 100 build up, the flexible distribution chute 42 bends and the discharge opening remains at the top surface 101, as shown in FIG. 3. As the top surface 101 lowers, the distribution chute 42 relaxes, allowing the discharge opening 43 to remain on the top surface 101. This insures that there will never be a significant gap between the discharge opening 43 and the top surface 101 which would allow the parts 100 to fall from the discharge opening 43 and be damaged. The configuration of the distribution chute 42 changes the travel direction of the parts 100 from slightly out of vertical to almost horizontal, depending on how high the discharge opening 43 is positioned by the top surface 101 of the parts 100.

Figure 4:
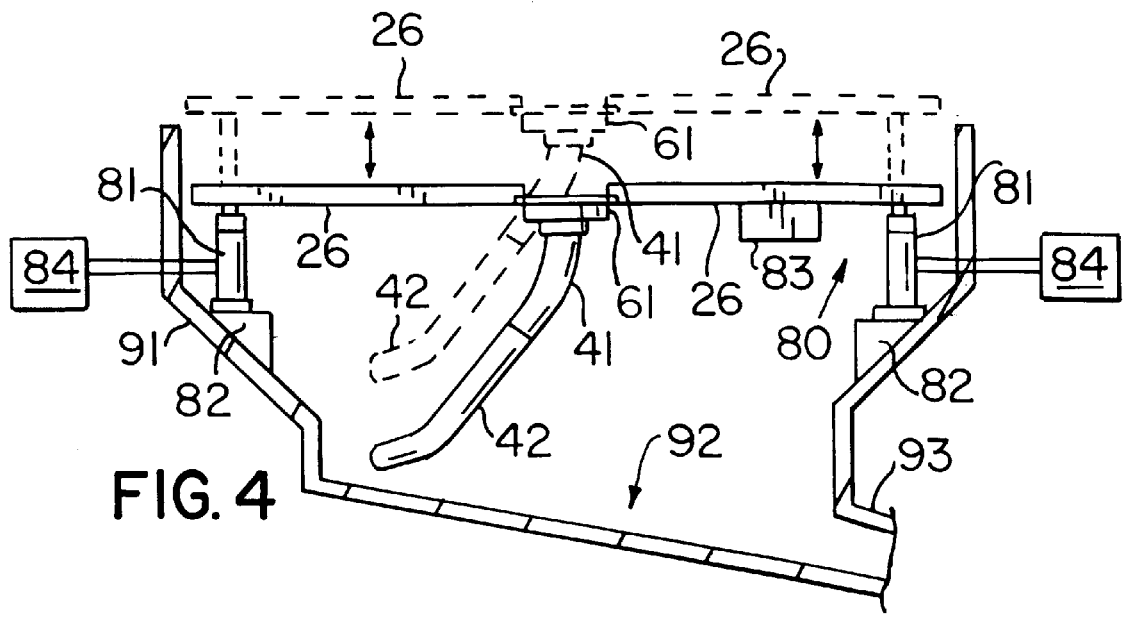
FIG. 4 is a partial view similar to FIG. 1 showing means to alter the height of the parts distribution apparatus relative to the storage hopper.

An alternative embodiment of the invention further incorporates height altering means 80 to alter the height of the parts distribution apparatus 10 relative to the storage hopper 90. This is shown in FIG. 4. As the top surface 101 of the parts 100 rises, sensor means 83 such as an optical photocell or IR transmitter and receiver monitors the height of the top surface 101 and actuates power means 84 which pneumatically, hydraulically or mechanically operate pistons 81 affixed to the storage hopper 90 by mounts 82. The pistons 81 are connected to the supports 26 of the parts distribution apparatus 10 and preferably raise the entire parts distribution apparatus 10 (as shown by the dashed lines), such that when the height of the top surface 101 reaches the predetermined maximum allowable height for successful gravity delivery of parts 100, the parts delivery means 40, and in particular the distribution chute 42 and the discharge opening 43, is raised, thereby allowing another layer of parts 100 to be deposited in the same manner as previously described.

I claim:

1. A parts distribution apparatus for use in combination with a storage hopper having a receptacle area, the apparatus comprising:

parts receiving means to receive parts dropped from above, said parts receiving means comprising a funnel hopper with an open top, inclined walls and a discharge spout aligned along a vertical axis;

parts delivery means to deliver parts into the receptacle area of the storage hopper to create a pile of parts having a top surface, said parts delivery means comprising a flexible distribution chute having a discharge opening, said parts delivery means connected to said parts receiving means such that parts received by said parts receiving means pass through said parts delivery means and exit said discharge opening onto said top surface in a travel direction angled away from said vertical axis; and means to move said discharge opening such that parts are discharged in different locations within the receptacle area of the storage hopper, said discharge opening movement means comprising means to rotate said discharge opening and said flexible distribution chute about said vertical axis, where the rotation direction is opposite to the direction of travel of parts exiting said discharge opening, and where said flexible distribution chute is pulled across the top surface of the parts previously deposited within the storage hopper such that said discharge opening also remains atop said top surface.

2. The apparatus of claim 1, where said discharge opening movement means comprises a roller clutch connected to said parts delivery means, an indexing piston for moving said roller clutch, and a drive controller for operating said piston, such that operation of said indexing piston rotates said distribution chute and said discharge opening in an indexed manner.

3. The apparatus of claim 1, where said discharge opening movement means comprises a motor.

4. The apparatus of claim 3, where said motor rotates said distribution chute and said discharge opening in an indexed manner.

5. The apparatus of claim 3, where said motor rotates said distribution chute and said discharge opening in a continuous manner.

6. The apparatus of claim 1, where said parts delivery means further comprises a rigid, curved elbow spout connected to said parts receiving means and to said flexible distribution chute.

7. The apparatus of claim 1, further comprising a liner member abutting said inclined walls of said funnel hopper.

8. The apparatus of claim 1, further comprising means to alter the height of the parts distribution apparatus relative to said top surface of said parts within the storage hopper.

9. The apparatus of claim 8, where said height altering means comprises pistons mounted on the storage hopper.

10. The apparatus of claim 9, where said height altering means further comprises sensor means to sense said top surface of said parts and power means to operate said pistons, where said sensor means actuates said power means to raise said parts distribution apparatus when said top surface reaches a predetermined maximum height.

11. A parts distribution apparatus comprising:

a storage hopper comprising a receptacle area for receiving and storing parts;

parts receiving means to receive parts dropped from above, said parts receiving means comprising a funnel hopper with an open top, inclined walls and a discharge spout aligned along a vertical axis;

parts delivery means to deliver parts into said receptacle area of said storage hopper to create a pile of parts having a top surface, said parts delivery means comprising a flexible distribution chute having a discharge opening, said parts delivery means connected to said parts receiving means such that parts received by said parts receiving means pass through said parts delivery means and exit said discharge opening onto said top surface in a travel direction angled away from said vertical axis; and means to move said discharge opening such that parts are discharged in different locations within said receptacle area of said storage hopper, said discharge opening movement means comprising means to rotate said discharge opening and said flexible distribution chute about said vertical axis, where the rotation direction is opposite to the direction of travel of parts exiting said discharge opening, and where said flexible distribution chute is pulled across said top surface of the parts previously deposited within said storage hopper such that said discharge opening also remains atop said top surface.

12. The apparatus of claim 11, where said discharge opening movement means comprises a roller clutch connected to said parts delivery means, an indexing piston for moving said roller clutch, and a drive controller for operating said piston, such that operation of said indexing piston rotates said distribution chute and said discharge opening in an indexed manner.

13. The apparatus of claim 11, where said discharge opening movement means comprises a motor.

14. The apparatus of claim 13, where said motor rotates said distribution chute and said discharge opening in an indexed manner.

15. The apparatus of claim 13, where said motor rotates said distribution chute and said discharge opening in a continuous manner.

16. The apparatus of claim 11, where said parts delivery means further comprises a rigid, curved elbow spout connected to said parts receiving means and to said flexible distribution chute.

17. The apparatus of claim 11, further comprising a liner member abutting said inclined walls of said funnel hopper.

18. The apparatus of claim 11, further comprising means to alter the height of the parts distribution apparatus relative to said top surface of said parts within said storage hopper.

19. The apparatus of claim 18, where said height altering means comprises pistons mounted on said storage hopper.

20. The apparatus of claim 19, where said height altering means further comprises sensor means to sense said top surface of said parts and power means to operate said pistons, where said sensor means actuates said power means to raise said parts distribution apparatus when said top surface reaches a predetermined maximum height.

* * * * *